United States Patent [19]

Tarng

[11] Patent Number: 5,409,408
[45] Date of Patent: Apr. 25, 1995

[54] SAILBOARD WITH RECIPROCATING FINS AND UMBRELLA TYPE ROTARY PARAFOIL SAIL

[76] Inventor: Min M. Tarng, 1367 Glenmoor Way, San Jose, Calif. 95129

[21] Appl. No.: 51,570

[22] Filed: Apr. 19, 1993

Related U.S. Application Data

[63] Continuation of Ser. No. 782,598, Oct. 25, 1991, abandoned, which is a continuation-in-part of Ser. No. 451,998, Dec. 18, 1989, Pat. No. 5,076,185.

[51] Int. Cl.⁶ ............................................. B63H 1/36
[52] U.S. Cl. ....................................... 440/15; 440/31; 114/39.1
[58] Field of Search .................. 440/14, 15, 16, 17, 440/18, 19, 20, 21, 22, 31; 114/362, 39.1, 39.2; 441/65, 74, 79

[56] References Cited

U.S. PATENT DOCUMENTS

| 227,491 | 5/1880 | Coulter | 440/14 |
|---|---|---|---|
| 943,074 | 12/1909 | Hildebrandt | 440/14 |
| 2,873,713 | 2/1959 | Baastrup | 440/21 |
| 4,568,290 | 2/1986 | Brown et al. | 440/13 |

FOREIGN PATENT DOCUMENTS

| 21272 | of 1911 | United Kingdom | 440/16 |
|---|---|---|---|
| 771975 | 4/1957 | United Kingdom | 440/15 |

OTHER PUBLICATIONS

Popular Science, Jun. 1955, p. 151.

*Primary Examiner*—Stephen P. Avila

[57] ABSTRACT

The windsurf board comprise a revolving sail, reciprocating fins and single sided pedal. The revolving sail rotates a drum to drive the reciprocating fin. On the drum, there are multiple cycles of slot knotched on the drum. One revolution of revolving sail will induce multiple flip-flop reciprocating motion of the reciprocating fin. The single sided-pedal uses the reciprocating motion to drive the reciprocating fins to propagate forward.

12 Claims, 10 Drawing Sheets

SAILBOARD WITH RECIPROCATING FINS AND UMBRELLA TYPE ROTARY PARAFOIL SAIL

This is a continuation of application Ser. No. 07/782,598, filed Oct. 25, 1991, now abandoned, which is a CIP of application Ser. No. 07/451,998, filed Dec. 18, 1989, now U.S. Pat. No. 5,076,185.

INTRODUCTION

The most popular water sport is the wind surf board. The wind surf board combines the sail boat with surf board. The rider has the close contact with water. It has much more fun than the sail boat. However, the surf board limits to sportmen. The rider struggles with the strong wind with his whole body weight. He cannot relax on the water. It makes recreational people feel very uncomfortable.

The windsurf board having the rotating parafoil umbrella is invented for both sport and recreation. It has the multiple functions of sail boat with revolving fan, the relax seat on water with sunshade umbrella. The rider needs not to adjust the sail according to the wind direction, either. The revolving sail has the same efficiency despite of the direction of wind. The transform efficiency of wind energy is high, we may use much smaller sail. The overturn torque is much smaller. Furthermore, the revolving sail has the automatic adjustment capability to avoid the overturn torque in the very strong wind. The floating water wings and damper fins help to maintain the stability of the board.

However, in the previous parent patent, the windsurf board adopts the water jet. The revolving sail converts the wind energy to the water jet to propel the board with the gear trains. The gear trains are embedded in the board. It costs a lot to build up the board having specical design. To be compatible with the conventional windsurf board, the reciprocating fins are adopted to propel the windsurf board.

SUMMARY OF THE INVENTION

The windsurf board comprises the revolving sails, reciprocating fins, single sided pedals and the multi-functional board. The revolving sail rotates to drive the horizontally aligned fin up and down. Stepping on the single-sided pedals, the vertically aligned reciprocating tail fin and reciprocating side fins propel the board forward, too.

DETAILED DESCRIPTION OF PREFERRED EMBODIMENTS OF THE INVENTION

Figure 1:
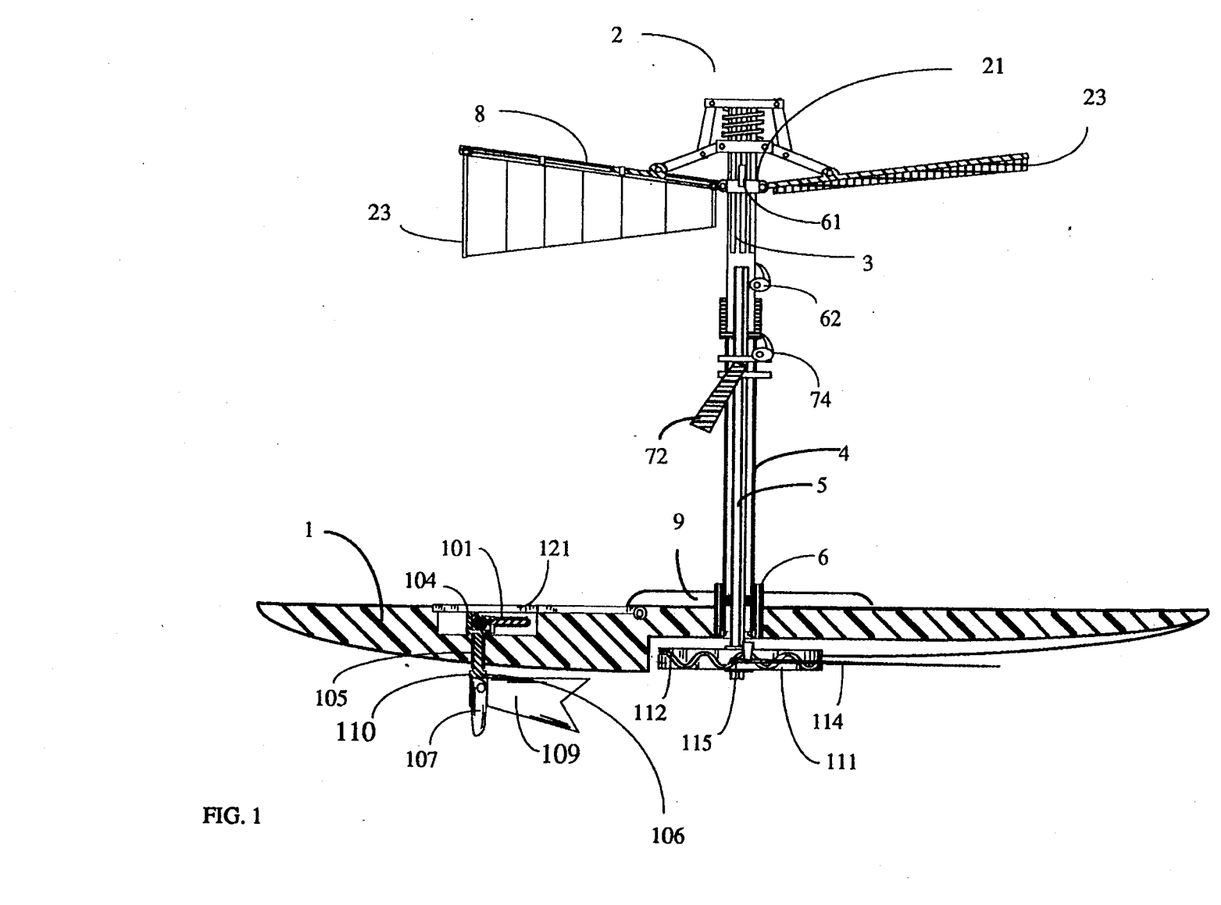
FIG. 1 is the partially exposed section view of the windsurf board with the reciprocating fins and the revolving sail; the revolving sail is in the operating position; one foldable seat is in the folded position.
Figure 2:
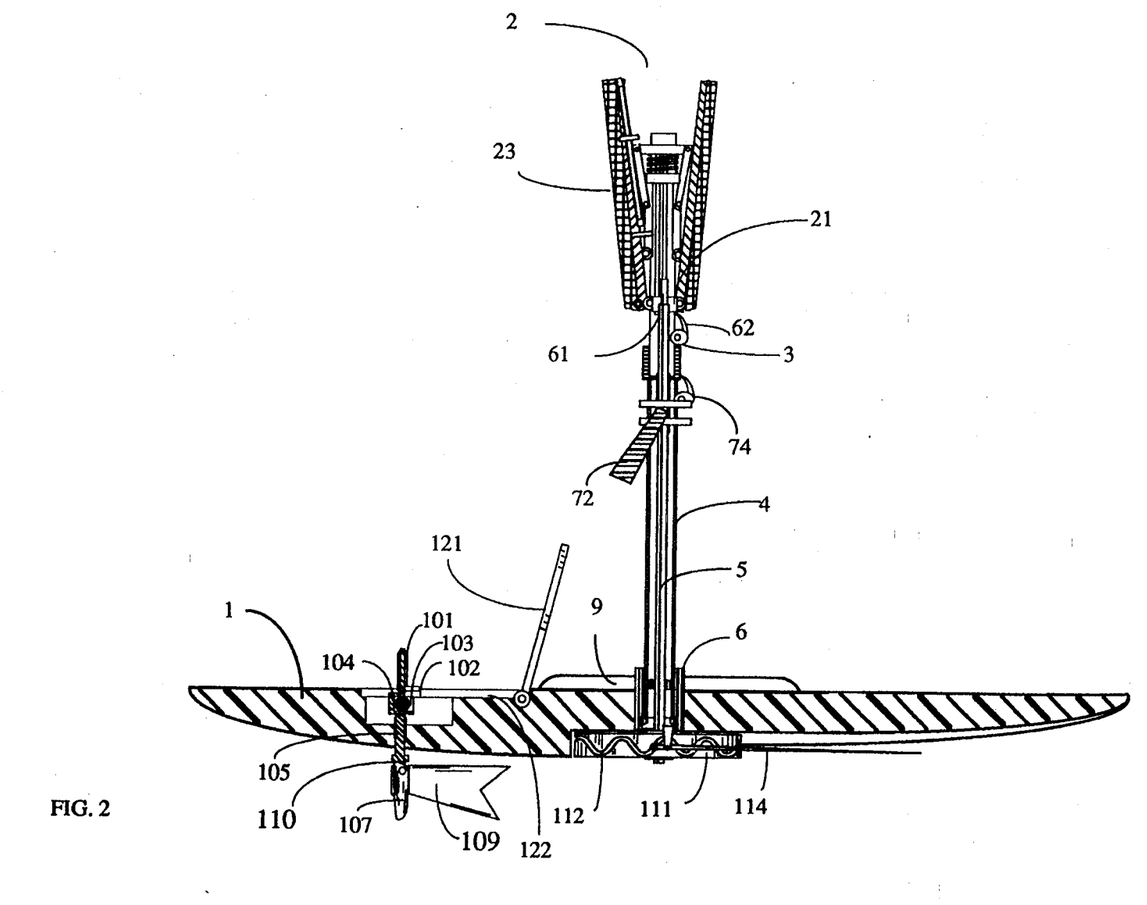
FIG. 2 is the partially exposed section view of the windsurf board with the reciprocating fins and the revolving sail; the revolving sail is in the folded up position; one foldable seat is in the raised position.
Figure 3:
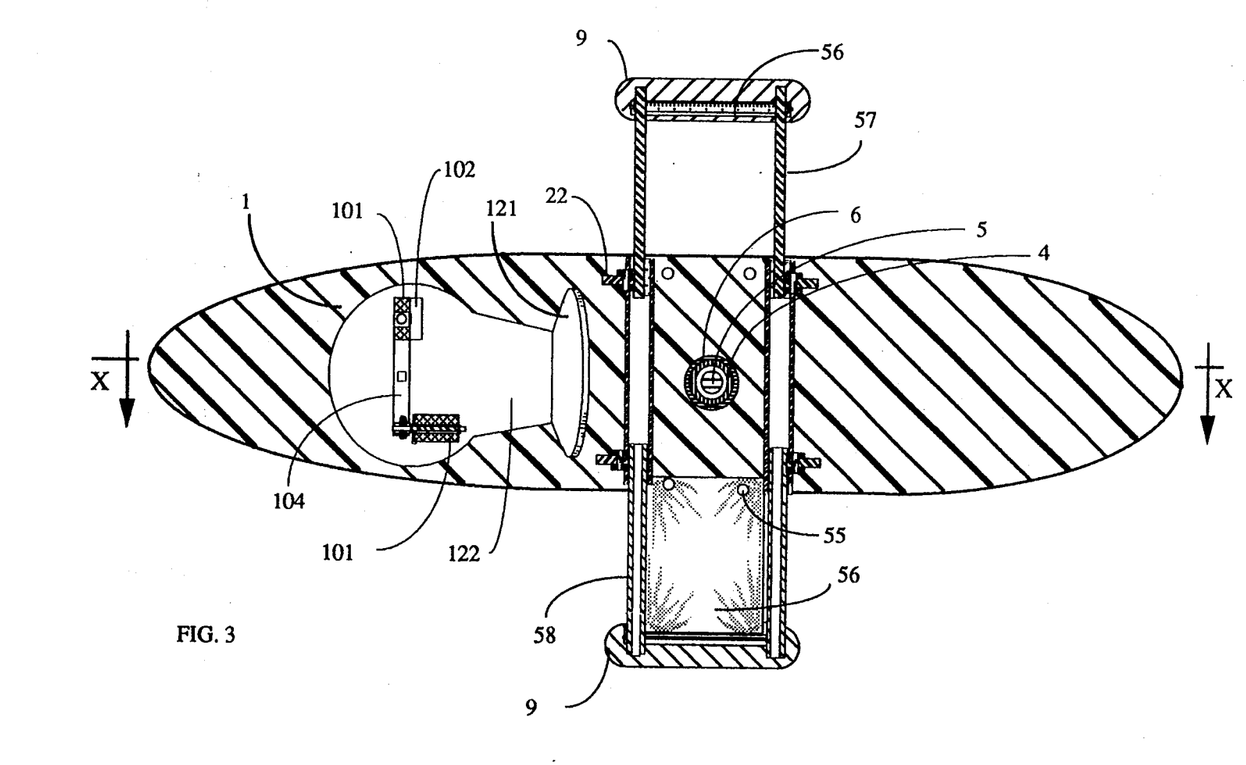
FIG. 3 is the partially exposed top section view of the windsurf board; the water wings are in the extended position.

Referring to FIG. 1 and FIG. 3, the windsurf board comprises of the board 1, revolving sail 2, single sided pedals 101, reciprocating side fins 109, vertically aligned reciprocating fin 109, horizontally aligned reciprocating fin 114, water wings 9, damping fins 56 and foldable seat 121. The windsurf board 1 uses the revolving sail 2 and the single sided pedals 101 to drive the reciprocating fins 107, 109 and 114 to propel forward. The wind blows the revolving sail 2 to rotate. The board 1 may have both the wind power and man power to propel it simultaneously. With the addition of man power to the wind power, the board 1 may steer into the wind directly. The revolving sail 2 is installed on the board 1. The mast 4 is inserted in the guide tube 6. The seat 121 may be folded that the board may serve as either the windsurf board or rest seat. As shown in FIG. 2, with the seal back 121 being opened, the seat back 121 can be raised up to be the reclining seat. The rider may sit on the board. As shown in FIG. 1, with the seat cover 121 being closed, the rider may stand on the board 1.

The revolving sail 2 offers the shadow to the rider, transmits the rotating torque to pole 3, minimizes the overturning torques and lifts the board 1 to increase the speed. The flexible sail 23 is preferred to be implemented with the parafoil. The flexible sails 23 hang on the cantilevels 8. The revolving sail 2 attaches the tail of parafoil 23 to the alcove cover. As the wind blows in the direction pointing into the paper, the left flexible sail 23 expands; the right flexible sail 23 becomes fiat. It causes the revolving sail 2 rotating in a single direction. This rotation transmits through the pole 3, axle 5, the slotted drum 111 and the horizontally aligned reciprocating fin 114 to propel the board 1. The pole 3 is installed at the top of the fixed mast 4. The pole 3 rotates the axle 5. The axle 5 drives the slotted drum 111 to rotate. The rotating shaft 5 passing through the board 1 to drive the slotted drum 111. The swiveling bars 115 are fed in the guiding slot 112. The horizontally aligned fin 114 swivels upward and downward having the pivotal bar 118 to be the pivot. The lock handle 61 is to lock the revolving sail 2 with the pole 3. The lock handle 62 is to lock the pole 3 with the axle 5. If the lock handle 61 is released, the revolving sail is released to rotate free on the pole 3. If the lock handle 62 is released, the revolving sail 2 rotates free.

There are several different ways to operate the revolving sail 2. As shown in FIG. 1, the revolving sail 2 serves as the sail, umbrella and rotating fan. As the sliding cylinder 21 is pulled downward, the revolving sail 2 is folded up as shown in FIG. 2. The flexible sails 23 are wrapped as the umbrella does. The windsurf board may stand still in the water.

Figure 4:
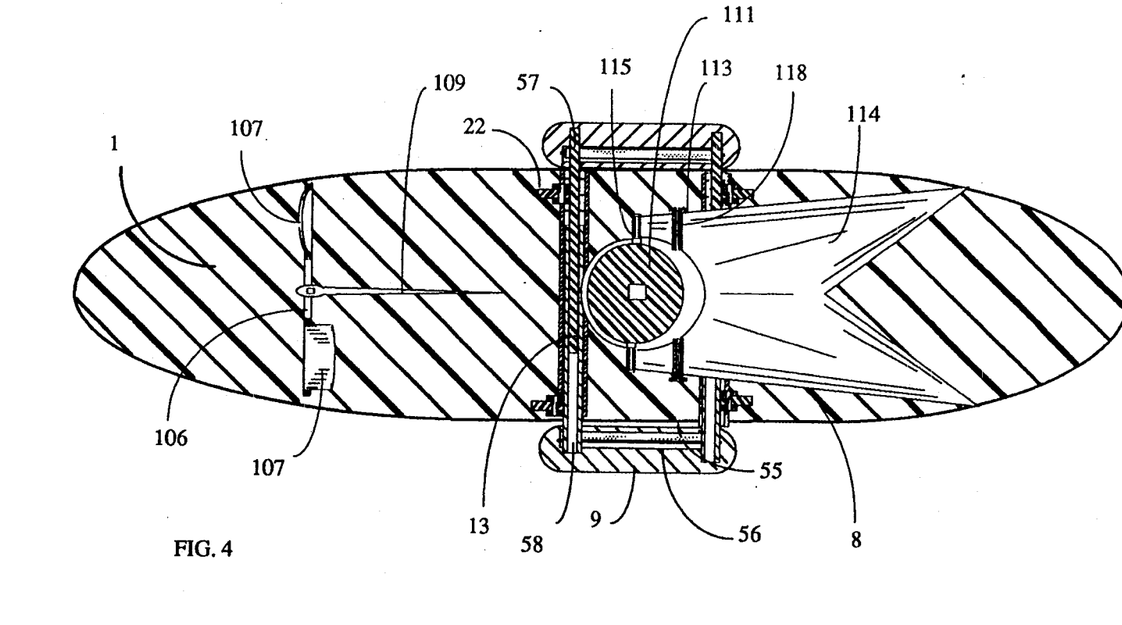
FIG. 4 is the partially exposed bottom section view of the windsurf board; the water wings are in the closed position.

FIG. 3 is the partially exposed top view of the board. The water wings 9 are in the extended positions. The left damper fin 56 is hinged to the buckles 55. In FIG. 3, the right damper fin 56 is still wrapped as a roll. The sleeve tubes 57 and 58 are locked with the cam lock 22. The sleeve tubes 57 and 58 share the same conduits. The tube 57 may slide inside the tube 58. As shown in FIG. 4, the sleeve tubes 57 and 58 may shrink to the closed position.

Referring to FIG. 2 and FIG. 3, the rider sits on the seat 122 with the cover 121 bing the seat back. The pedals 101 can be raised and folded up. The rider has the heels being supported by the supporter 102 and steps on the pedals 101 reciprocally. Referring to FIG. 3 and FIG. 4, the level links 104 and 106 of crank swivel reciprocally. The reciprocating side fins 107 and tail fin 109 expel the water backwards.

Figure 5:
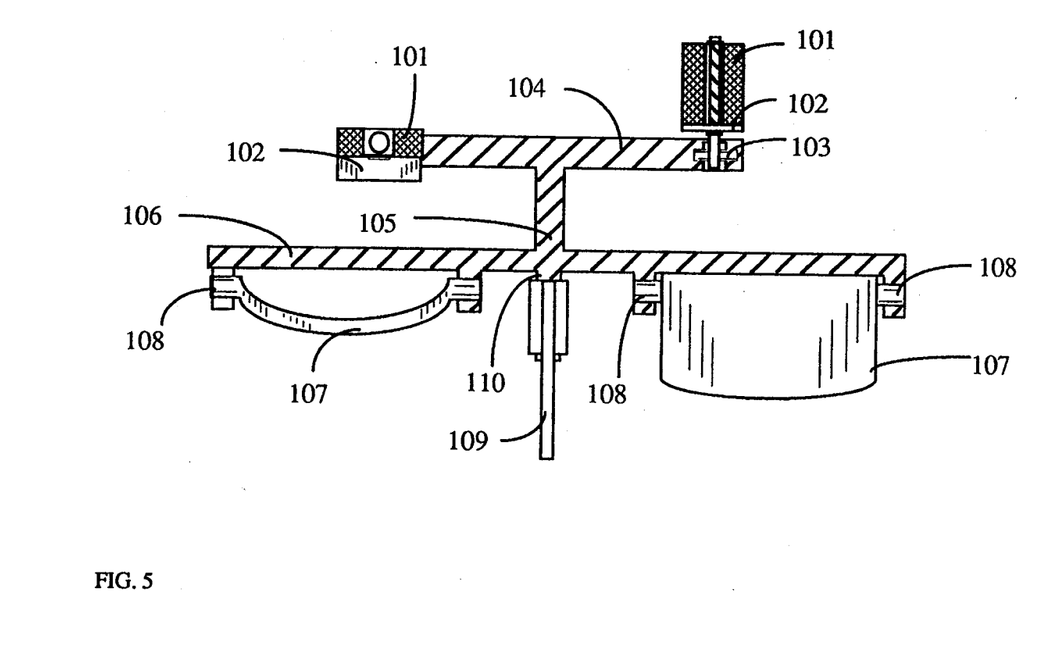
FIG. 5 is the partially exposed section view of the vertically aligned reciprocating fins of the side fins and tail fin.
Figure 6:
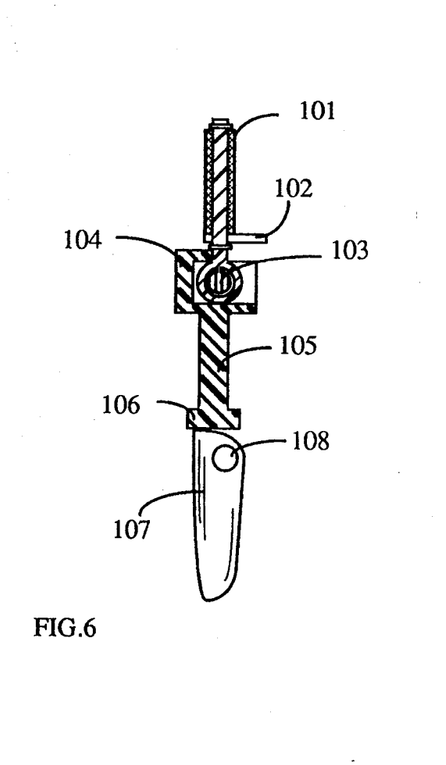
FIG. 6 is the partially exposed side view of the vertically aligned reciprocating fins of the side fins.
Figure 7:
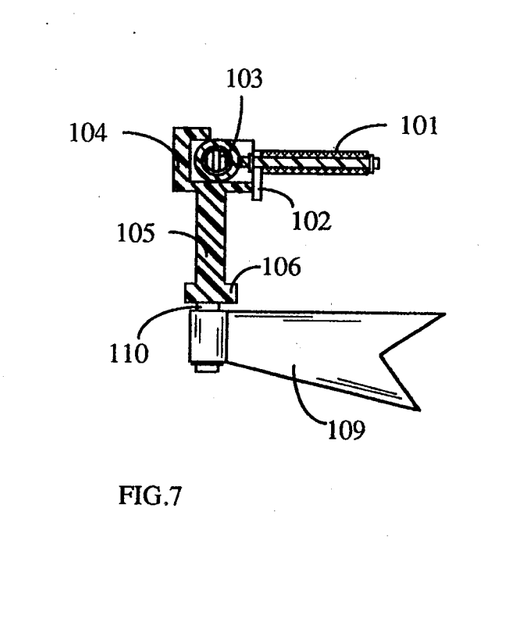
FIG. 7 is the partially exposed side view of the vertically aligned reciprocating fins of the tail fin.

From FIG. 5 to FIG. 9, they show the enlarged views of the structures of the reciprocating fins. FIG. 6 is the partially exposed section view of the side fin and single sided pedal. In FIG. 6, the pedal 101 is in the operating position. FIG. 7 is the partially exposed section view of the tail fin and pedal. In FIG. 7, the pedal is folded up.

With two pedals being raised up, the rider steps on the pedal 101 to rotate the crank made of links 104, 105 and 106. The side fin 107 has the curved shape. The side fin swings between the horizontal position and the vertical position. Stepping on the left pedal 101, the right fin 107 moves backward and the left fin 107 moves forward. Since the curved fin 107 hits against the level link 106 that it can expel the water backward. As shown in FIG. 6, the right fin 107 is vertical to expel the water backward. On he contrary, under the force of water flow, the left fin 107 becomes flat that the water resistance is pretty small. So the net force is to propel the board 1 forward. Similarly, as the right pedal 101 is pressed, the left side fin 107 becomes vertical; the right side fin 107 becomes flat. The water is expelled backward by the left side fin 107. The reciprocating side fins 107 convert the reciprocating crank motion to be the propelling force. Referring to FIG. 5 and FIG. 7, as the crank swivels reciprocally, the vertical shaft 110 also swivels reciprocally. Since the square end of shaft 110 passes through the tail fin 109, the tail fin 109 swivels right and left to expel the water backward to propel the board 1 forward.

Figure 8:
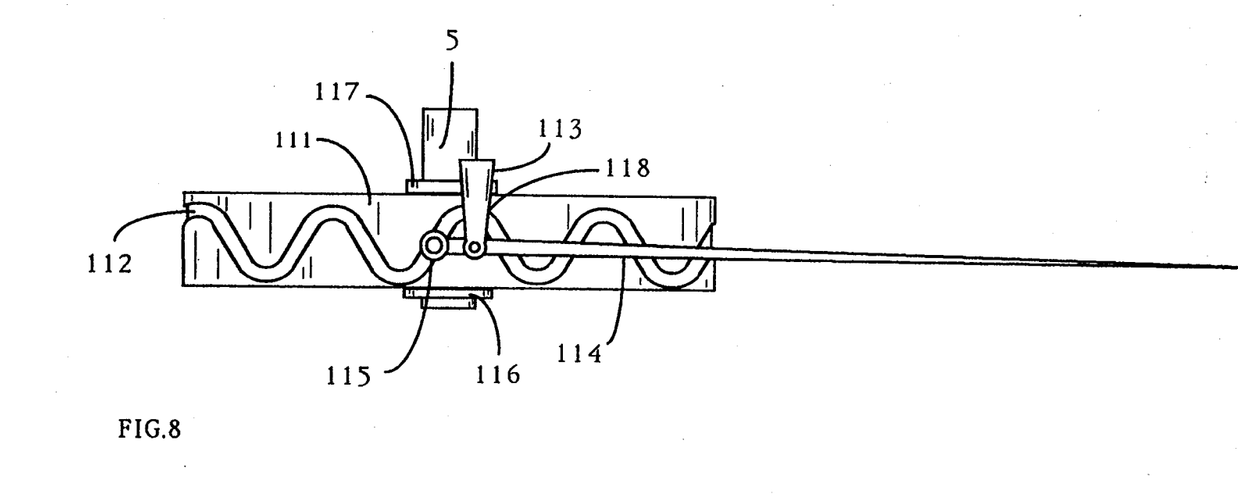
FIG. 8 is the side view of the horizontally aligned reciprocating tail fin.
Figure 9:
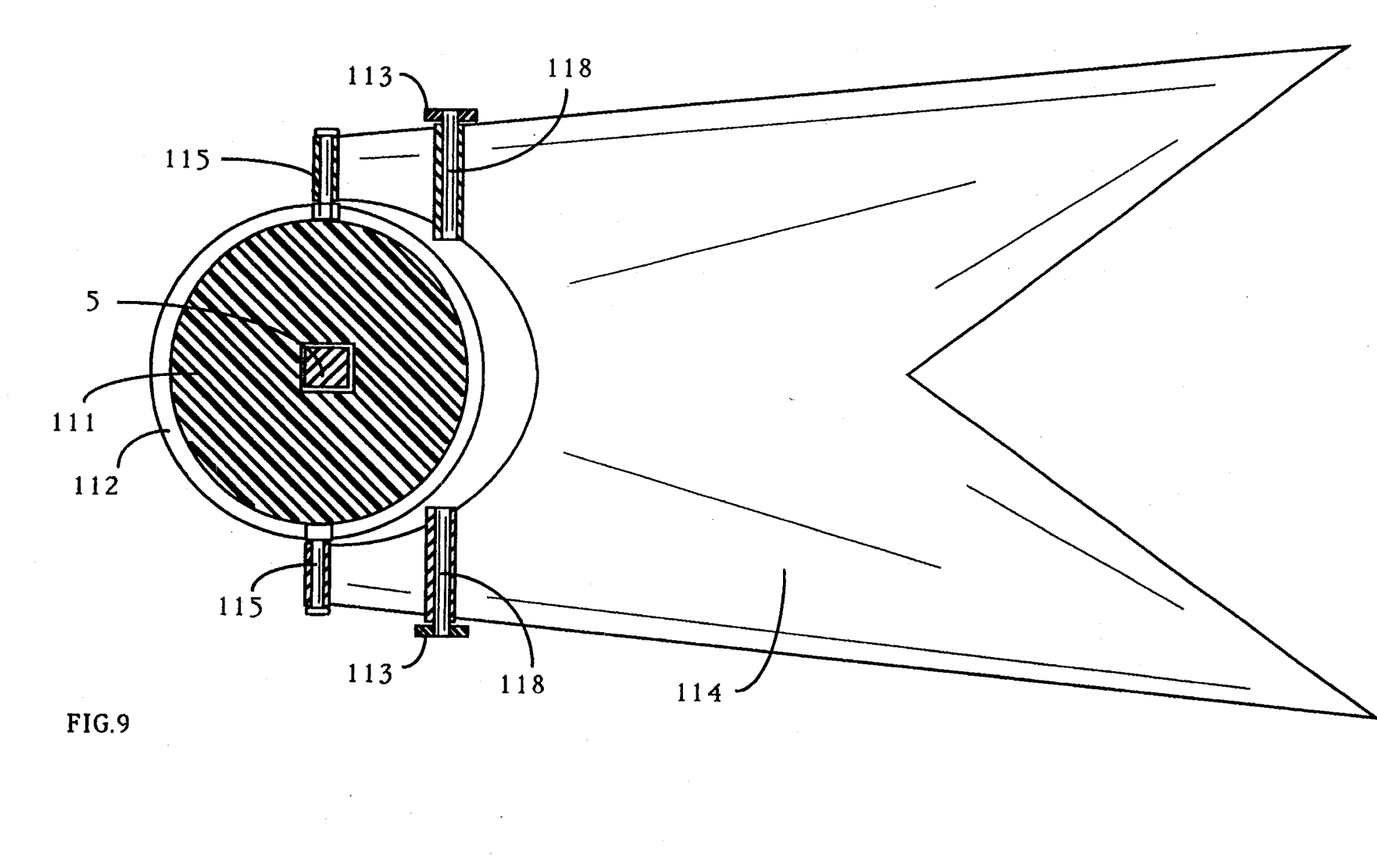
FIG. 9 is the bottom view of the horizontally aligned reciprocating tail fin.

FIG. 8 and FIG. 9 shows the rotating slotted drum 111 to driving the horizontal aligned fin 114 to swivel up and down. The fin 114 is pivoted at the pivot bar 118. The pivot bar 118 is attached to the frame 113. The frame 113 is fixed to the bottom of board 1. The driving bar 115 has one end sliding inside the slot 112. The slot 112 has the even number of periods of sinusoidal curve. As the slotted drum rotates, the right and left bars 115 move up and down simultaneously. The clamping washers 116 and 117 hold the rotating drum 111. The square end of driving shaft 5 passes through the rotating drum 111 to drive the rotating drum 111 to rotate. As the slot 112 rotates, the guided bars 115 shift up and down in the slot 112. The fin 114 pivots at the pivotal support 118 and swivels up and down due to the up and down movement of guided bar 115.

With the above reciprocating design, the conventional board is easily to modify to be the sailboard with reciprocating fins and umbrella type rotary parafoil sail. Changing the sail to be conventional triangle sail, it can also serve as the conventional windsurf board. The rider has more choices and funs to enjoy the water recreation. The old man, beautiful lady and young boy, etc can enjoy the water activities with the strong man at the same time in the same water area. It makes the water activities much more attractable and enjoyable.

Figure 10:
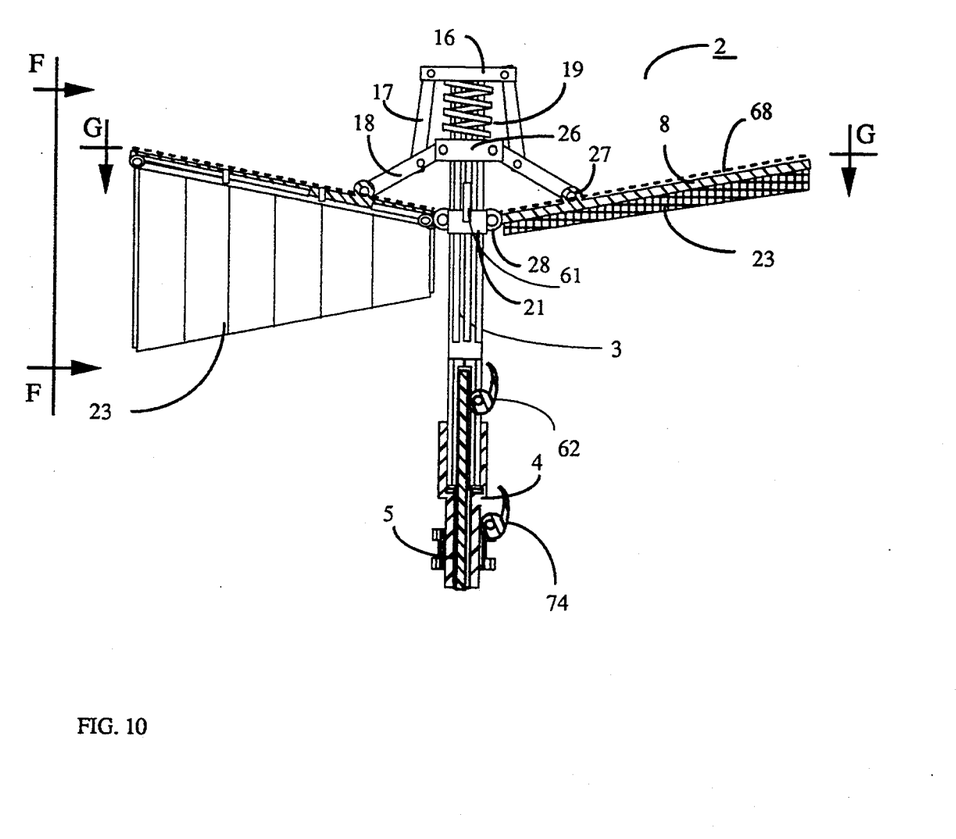
FIG. 10 is the partially exposed section view of the revolving sail; the parafoils swings between the vertical and horizontal positions.
Figure 11:
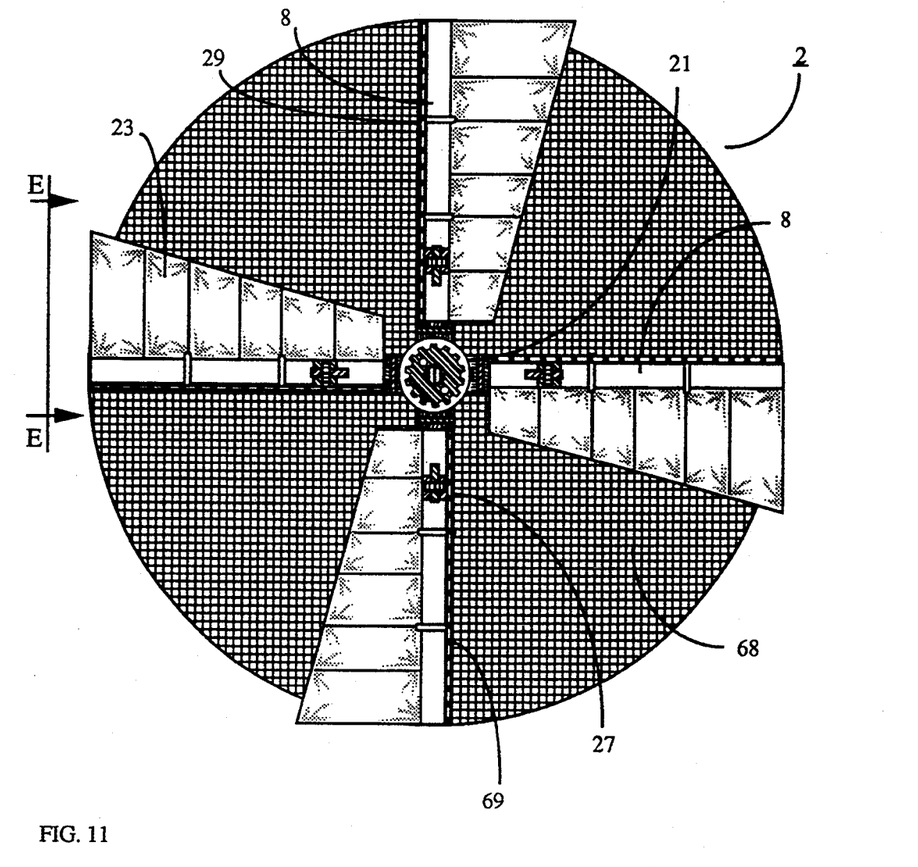
FIG. 11 is the partially exposed top view of the revolving sail; the opening of parafoils can be sealed with the zippers.
Figure 12:
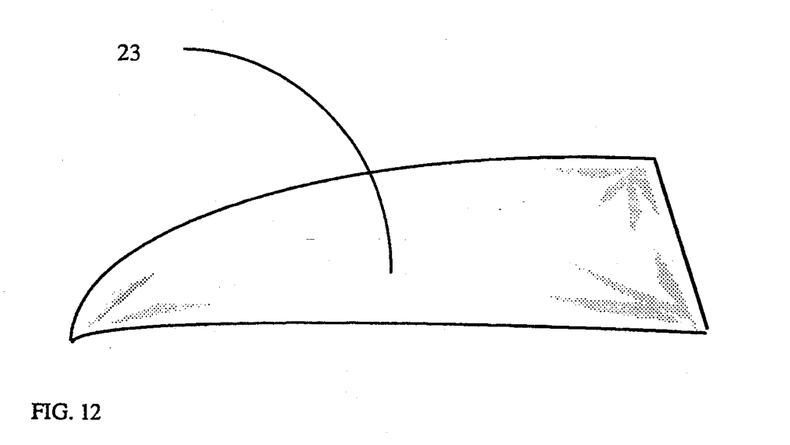
FIG. 12 is the side view of parafoil sail taken at the F—F line in FIG. 10 and E—E line in FIG. 11.

From FIG. 10 to FIG. 12 show the detailed structures Of the wind propelled apparatus. Similar to the umbrella, covering on the cantilevers 8 is the alcove cover 68. The alcove cover 68 is made of the gauze. It offers the shadow to the rider, transmits the rotating torque to pole 3, minimizes the overturning torques and lifts the board 1 to increase the speed. FIG. 10 shows the detailed design of the revolving sail 2. The cantilever 8 is hinged to the sliding ring 21 and is pivoted at the tip of the rocker arm 18. The rocker arm 18 is hinged to the spring retainer 26 and pivoted at the tip of the stirrup 17. There are two spring retainers 16 and 26 clamping the coil spring 19. The spring retainer 16 tamps the end of pole 3 to hold the coil spring 19. The coil spring 19 expands against the spring retainer 26 and the spring retainer 26 moves downward. The rocker arms 18 raise the cantilevers 8. The sliding ring 21 moves upward. The revolving sails 2 are in the extended position as shown in FIG. 10. The flexible sails 23 hang on the cantilevels 8. As shown in FIG. 11, the revolving sail 2 attaches the tail of parafoil 23 to the alcove cover 68. The flexible sail 23 is preferred to be implemented with the parafoil as shown in FIG. 12. The revolving sail 2 can be scaled with the zipper 69.

While embodiments and applications of this invention have been shown and described, it would be apparent to those skilled in the art that many more modifications are possible without departing from the inventive concepts herein. The invention, therefore, is not to be restricted except in the spirit of the appended claims.

What is claimed is:

1. A driving apparatus for a floating body comprising a rotating drum, a driving bar and a horizontally aligned reciprocable fin,
    said rotating drum having a curved slot positioned along a peripheral of said drum with the slot facing sidewise,
    said driving bar guided inside said slot moving up and down while said rotating drum is rotated,
    said fin being attached to said driving bar and being pivoted at a pivot bar, said pivot bar being attached to a frame of said floating body.

2. A driving apparatus for a floating body according to claim 1, wherein said curved slot is a sinusoidal curve.

3. A wind propelled apparatus comprising a floating body and a revolving power conversion mechanism, said revolving power conversion mechanism comprising a revolving sail, a pole, a plurality of cantilevers and propelling means,
    said plurality of cantilevers being supported by said pole, said revolving sail comprising a plurality of flexible sails, each flexible sail being attached to one of said cantilevers, said flexible sails receiving differential wind force in any wind direction and resulting in a revolving motion, an axle of said pole being able to be locked or unlocked to said pole;

said propelling means comprising a rotating drum, a driving bar and a horizontally aligned reciprocable fin, said axle being locked with said drum, said drum being rotated while said axle is rotated, said revolving motion being transmitted to a rotating motion of said drum when said axle is locked with said pole, said rotating drum having a curve slot positioned along a peripheral of said drum with the slot facing sidewise, said driving bar guided inside said slot moving up and down while said rotating drum is rotated, said fin being attached to said driving bar and being pivoted at a pivot bar, said pivot bar being attached to a frame of said floating body.

4. A wind propelled apparatus according to claim 3, wherein said curved slot is a sinusoidal curve.

5. A wind propelled apparatus according to claim 3 further comprising a plurality of water wings with retractable damper fins and a plurality of rest seats, said water wings mounted on sleeve tubes being installed on two sides of said floating body to counter an overturning torque, said retractable damper fins being attached between said floating body and said water wings, said rest seats being foldable and being mounted on said floating body.

6. A wind propelled apparatus according to claim 3, further comprising a single sided pedal system, said single sided pedal system comprising a plurality of pedals, a crank, a plurality of reciprocable side fins and a tail fin, said pedals being attached to said crank and rotating said crank to make a reciprocating motion of said side fins while a rider steps on said pedals, a tail fin being vertically aligned and pivoted by a shaft which is attached to the center of said crank, said tail fin swiveling left and right while said crank is rotated back and forth, a plurality of side fins being attached to said crank on either side, each side fin being pivoted by a pivot bar, said side fins being flattened horizontally by a viscosity force of water while said side fins moves forward in said water and hitting against said crank while said side fins moves backward in the water which allows said side fins to expel water backward and propel the floating body forward.

7. A wind-powered and man-powered floating apparatus according to claim 6, wherein said curved slot is a sinusoidal curve.

8. A wind-powered and man-powered floating apparatus according to claim 7 further comprising a plurality of water wings with retractable damper fins and a plurality of rest seats, said water wings mounted on sleeve tubes being installed on two sides of said floating body to counter an overturning torque, said retractable damper fins being attached between said floating body and said water wings, said rest seats being foldable and being mounted on said floating body.

9. A wind-powered and man-powered floating apparatus according to claim 8, wherein said seats have seat backs which are foldable to cover the seats and provide a smooth surface for wind surfing.

10. A side fin driving apparatus for a floating body having driving forward, backward and braking capability comprising a plurality of push-pull means, a crank and a plurality of reciprocable side fins locating in the middle portion and beneath said floating body, a rider using hands or feet to push and pull said push and pull means to have said crank to have reciprocating reversible motion, said crank having an upper lever, a lower lever and a central beam, said central beam passing through said floating body;

said pedals being attached to the upper lever of said crank, said side fins being attached to the lower lever of said crank, said central beam linking said lower lever and said upper lever together, said pedals rotating said crank to make a rotationally reciprocating motion of said side fins while a rider steps on said pedals, each of said side fins being pivoted by a pivot bar, said side fins being flattened horizontally by a viscosity force of water while said side fins move forward in said water and hitting against said crank while said side fins move backward in the water which allows said side fins to expel water backward and propel the floating body forward, said side fin being horizontally hinged, said side fins starting from vertical position to horizontal position to become flattened to glide, said side fins starting from horizontal position to vertical position to propagate, by rotating said crank 90 degrees, said side fins driving to propagate said floating body sideward;

by rotating said crank 180 degrees, said side fins exchanging positions and applying braking force to stop said floating body, said braking force being countered by said central beam supported by said floating body;

by rotating said crank 180 degrees and stepping on said pedals, said side fins exchanging positions to allow said floating body to be propelled backward;

by varing said crank any degrees, said side fins driving said floating body into any direction directly.

11. A side fin driving apparatus for a floating body having driving forward, backward and braking capability comprising a plurality of push-pull means, a crank and a plurality of reciprocable side fins locating in the middle portion and beneath said floating body, a rider using hands or feet to push and pull said push and pull means to have said crank to have reciprocating reversible motion, said crank having an upper lever, a lower lever and a central beam, said central beam passing through said floating body;

said pedals being attached to the upper lever of said crank, said side fins being attached to the lower lever of said crank, said central beam linking said lower lever and said upper lever together, said pedals rotating said crank to make a rotationally reciprocating motion of said side fins while a rider steps on said pedals, each of said side fins being pivoted by a pivot bar, said side fins being flattened by a viscosity force of water while said side fins move forward in said water and hitting against said crank while said side fins move backward in the water which allows said side fins to expel water backward and propel the floating body forward, by rotating said crank 90 degrees, said side fins driving to propagate said floating body sideward;

by rotating said crank 180 degrees, said side fins exchanging positions and applying braking force to stop said floating body, said braking force being countered by said central beam supported by said floating body;

by rotating said crank 180 degrees and stepping on said pedals, said side fins exchanging positions to allow said floating body to be propelled backward;

by varing said crank any degrees, said side fins driving said floating body into any direction directly;

said side fins being made of a curvature means, said curvature means reducing drag force and increasing propagating force and braking force; said curvature means hitting against the lower lever of said crank while said side fins move backward in the water which allows said side fins to expel water backward and propel the floating body forward.

12. A side fin driving apparatus for a floating body having driving forward, backward and braking capability comprising a daggerboard, a plurality of push-pull means, a crank and a plurality of reciprocable side fins locating in the middle portion and beneath said floating body, a rider using hands or feet to push and pull said push and pull means to have said crank to have reciprocating reversible motion, said crank having an upper lever, a lower lever and a central beam, said central beam passing through said floating body;

said pedals being attached to the upper lever of said crank, said side fins being attached to the lower lever of said crank, said central beam linking said lower lever and said upper lever together, said pedals rotating said crank to make a rotationally reciprocating motion of said side fins while a rider steps on said pedals, each of said side fins being pivoted by a pivot bar, said side fins being flattened by a viscosity force of water while said side fins move forward in said water and hitting against said crank while said side fins move backward in the water which allows said side fins to expel water backward and propel the floating body forward, by rotating said crank 90 degrees, said side fins driving to propagate said floating body sideward;

by rotating said crank 180 degrees, said side fins exchanging positions and applying braking force to stop said floating body, said braking force being countered by said central beam supported by said floating body;

by rotating said crank 180 degrees and stepping on said pedals, said side fins exchanging positions to allow said floating body to be propelled backward;

by varing said crank any degrees, said side fins driving said floating body into any direction directly.

said daggerboard means serving as daggerboard, rudder and tail fin, said daggerboard means is vertically aligned on the rear side of said side fins and is pivoted by a shaft mounted on the central beam of said crank, said daggerboard means swiveling left and right to propel said floating body while said crank is rotated back and forth.

* * * * *